(12) United States Patent
Hoffmann

(10) Patent No.: US 11,063,409 B2
(45) Date of Patent: Jul. 13, 2021

(54) GAS ARRESTER

(71) Applicant: TDK Electronics AG, München (DE)

(72) Inventor: Robert Hoffmann, Berlin (DE)

(73) Assignee: TDK ELECTRONICS AG, Munich (DE)

( * ) Notice: Subject to any disclaimer, the term of this patent is extended or adjusted under 35 U.S.C. 154(b) by 150 days.

(21) Appl. No.: 16/329,703

(22) PCT Filed: Jun. 7, 2017

(86) PCT No.: PCT/EP2017/063840
§ 371 (c)(1),
(2) Date: Feb. 28, 2019

(87) PCT Pub. No.: WO2018/041430
PCT Pub. Date: Mar. 8, 2018

(65) Prior Publication Data
US 2019/0199067 A1    Jun. 27, 2019

(30) Foreign Application Priority Data

Aug. 30, 2016 (DE) .......................... 102016116148.9

(51) Int. Cl.
| | |
|---|---|
| *H01T 4/12* | (2006.01) |
| *H01T 4/04* | (2006.01) |
| *H02H 9/06* | (2006.01) |
| *H01T 4/08* | (2006.01) |
| *H01T 1/22* | (2006.01) |
| *H01T 2/02* | (2006.01) |
| *G06F 1/00* | (2006.01) |
| *H02H 3/22* | (2006.01) |

(52) U.S. Cl.
CPC ................. *H01T 4/12* (2013.01); *H01T 4/04* (2013.01); *H01T 4/08* (2013.01); *H02H 9/06* (2013.01); *G06F 1/00* (2013.01); *H01T 1/22* (2013.01); *H01T 2/02* (2013.01); *H02H 3/22* (2013.01)

(58) Field of Classification Search
USPC .................................. 361/119–120, 128–130
See application file for complete search history.

(56) References Cited

U.S. PATENT DOCUMENTS

| 4,074,338 A | * | 2/1978 | Simokat | .................... H01T 4/12 |
| | | | | 361/129 |
| 7,872,844 B2 | | 1/2011 | Yoneda et al. | |
| 2002/0041477 A1 | * | 4/2002 | Ikeda | ........................ H01T 4/12 |
| | | | | 361/120 |
| 2004/0027779 A1 | | 2/2004 | Byrne et al. | |
| 2004/0125530 A1 | | 7/2004 | Tominaga et al. | |
| 2009/0154052 A1 | | 6/2009 | Yoneda et al. | |

(Continued)

FOREIGN PATENT DOCUMENTS

| CN | 101258565 A | 9/2008 |
| EP | 0471948 A2 | 2/1992 |
| JP | S56121278 A | 9/1981 |

(Continued)

*Primary Examiner* — Danny Nguyen
(74) *Attorney, Agent, or Firm* — Slater Matsil, LLP

(57) ABSTRACT

A gas arrester is disclosed. In an embodiment a gas arrester for data line systems includes a discharge electrode, a plurality of individual electrodes for connection to data lines and a common gas discharge region formed between the individual electrodes and the discharge electrode.

20 Claims, 4 Drawing Sheets

(56) References Cited

U.S. PATENT DOCUMENTS

2010/0005320 A1* 1/2010 Squillante ............... H04L 12/10
  713/300
2015/0280428 A1 10/2015 Wiese et al.

FOREIGN PATENT DOCUMENTS

| JP | S57121181 A | 7/1982 |
| JP | S61199895 U | 12/1986 |
| JP | H07107867 B2 | 11/1995 |
| JP | 2013105624 A | 5/2013 |

* cited by examiner

FIG 1A
FIG 1B
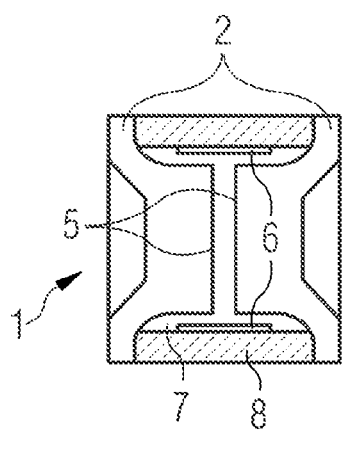
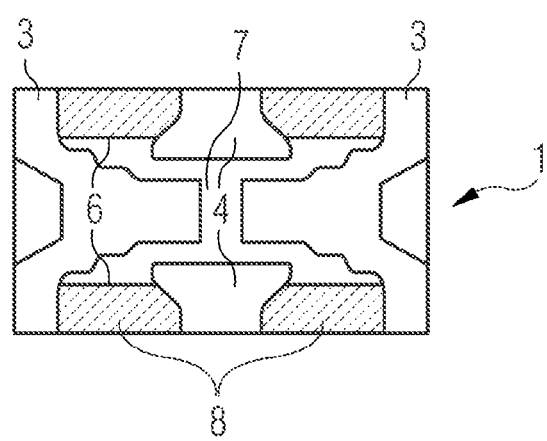

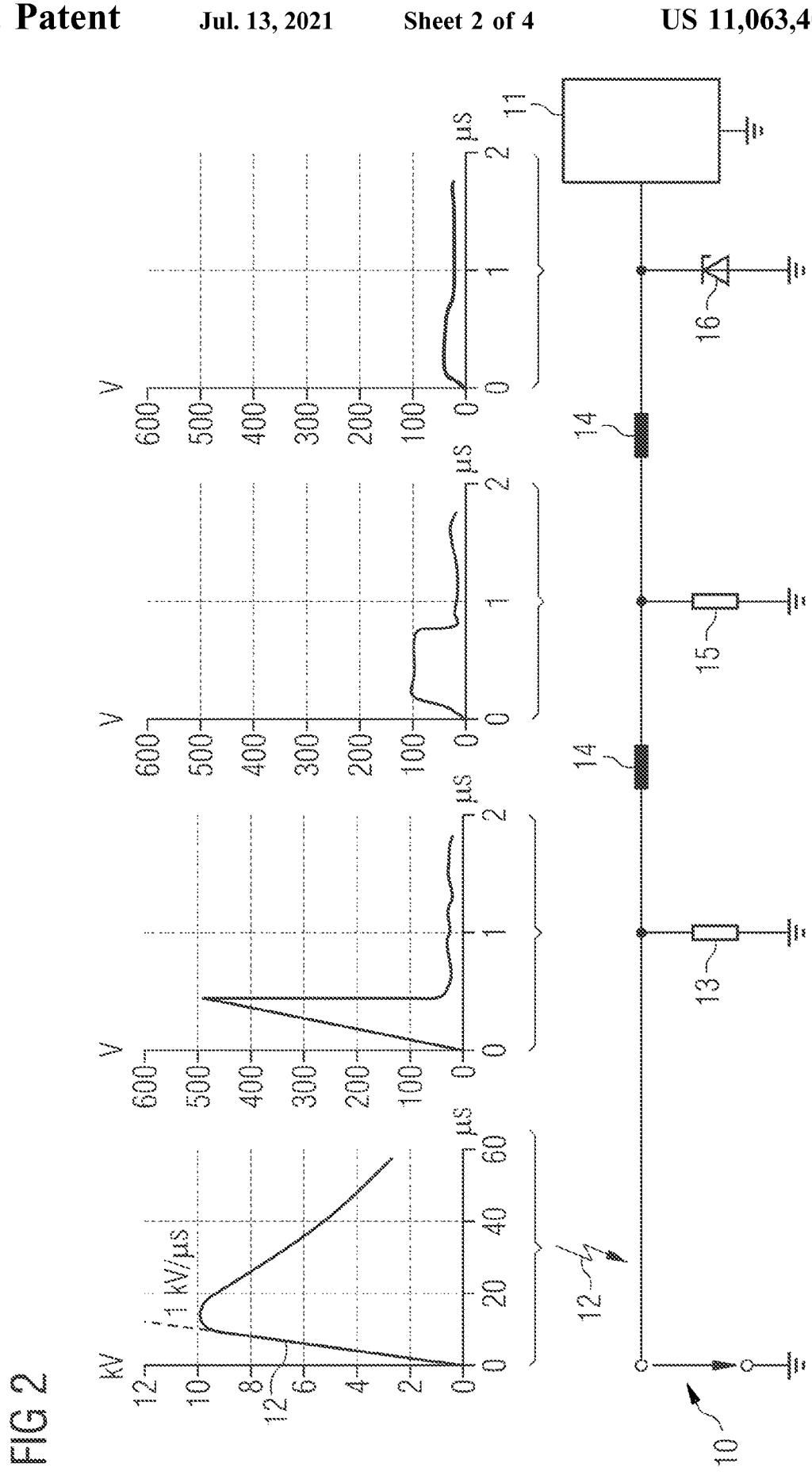

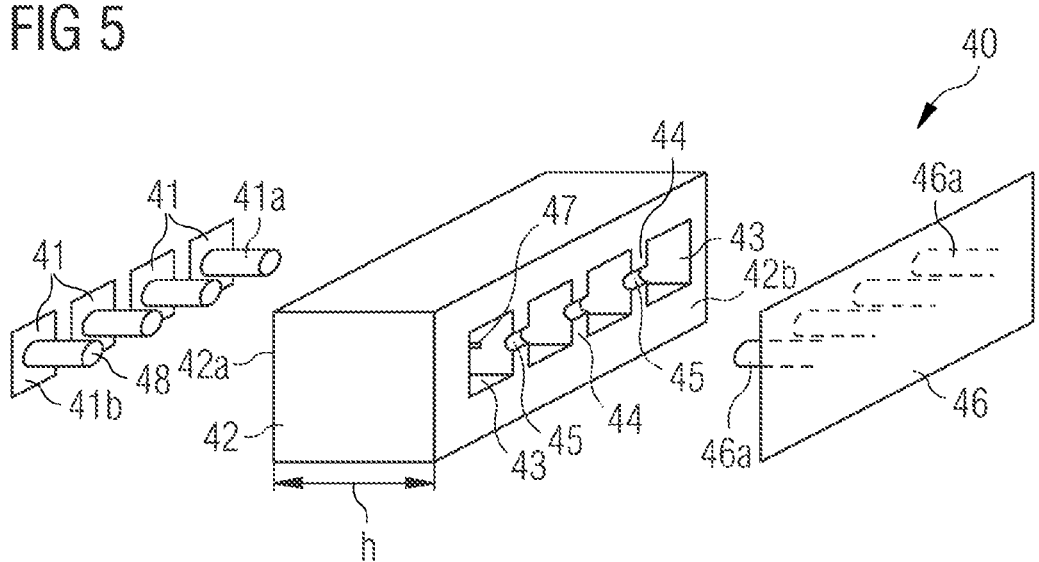
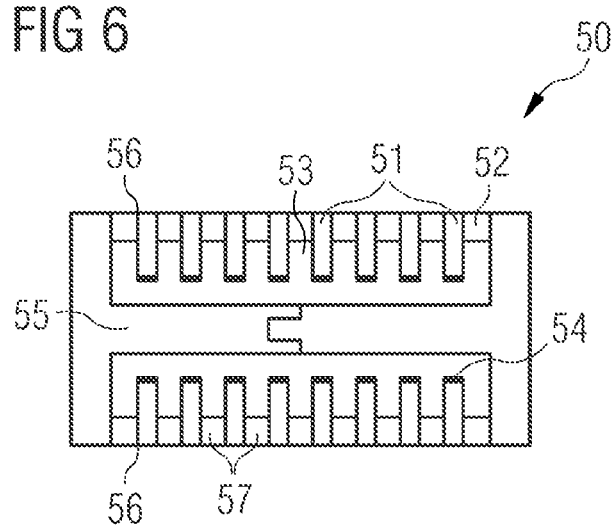

GAS ARRESTER

This patent application is a national phase filing under section 371 of PCT/EP2017/063840, filed Jun. 7, 2017, which claims the priority of German patent application 102016116148.9, filed Aug. 30, 2016, each of which is incorporated herein by reference in its entirety.

TECHNICAL FIELD

The invention relates to a gas arrester, in particular to a gas arrester for data line systems. The invention further relates to the use of a gas arrester.

BACKGROUND

The protection of data lines in telecommunications applications against over-voltages and over-currents presents a major challenge to manufacturers of protection elements. The protection elements must, on the one hand, limit the voltage promptly and must be able to withstand high lightning currents. On the other hand, the capacitance of the protection elements must be as low as possible, in order not to affect the transmitted signal.

A so-called graded protection is integrated for this purpose in the majority of applications. This means that a plurality of different, decoupled, protection elements are connected one after another, in order to compensate for the disadvantages of the one through the advantages of the other. The assembly resulting from this for the protection against over-voltages and over-currents is thus complex and very voluminous.

Conventional over-voltage protection elements furthermore usually only have two terminals, and can protect at most one core with respect to ground. In the case of data lines with more than two cores, this necessarily results in a high space requirement (one protection element per core).

Until now, the problem with data line systems with significantly more than two lines has not been satisfactorily solved. It is true that there are arresters with more than three electrodes that can be contacted from outside. However, these can only limit voltage differences between neighboring line cores. Excessively high voltage differences that can destroy the assembly can arise between core pairs.

SUMMARY OF THE INVENTION

Embodiments provide a primary protection of these applications (high lightning currents, input protection).

Embodiments provide an improved gas arrester, for example, a gas arrester that is particularly simple, space-saving and/or economical, and/or that particularly effectively protects data line systems with more than two lines against over-voltages. A further object consists in indicating the use of an improved gas arrester.

A gas arrester is indicated according to one aspect. The gas arrester is designed to protect data line systems against over-voltages and over-currents. The gas arrester is, in particular, designed for the protection of electronic components that comprise at least two data lines, preferably however significantly more data lines, for example, 4, 6 or 8 data lines. Preferably the gas arrester is designed to be surface mountable (SMD—surface mountable device). The gas arrester can, in other words, be fully automatically mounted on the surface of a circuit board.

The gas arrester comprises a discharge electrode. The discharge electrode is, preferably, a common electrode that can be contacted from outside. The discharge electrode is preferably at ground potential.

The gas arrester further comprises a plurality of further individual electrodes. The individual electrodes can all be contacted independently of one another. The individual electrodes can be of angular design, for example, rectangular, or round, for example, cylindrical. A mixture of both shapes is also conceivable.

The individual electrodes are designed and arranged for connection to data lines. The gas arrester comprises, for example, four, five, six, seven or eight individual electrodes. A lower number of individual electrodes, for example, two or three individual electrodes, or a higher number of individual electrodes, for example, ten individual electrodes, is of course also conceivable. The number of individual electrodes can, in other words, be scaled.

Due to the large number of individual electrodes, a plurality of cores or core pairs of the data line system can be protected with respect to ground. One individual electrode is provided here for each conductor of a pair. The discharge electrode is at ground potential. Data line systems with >>2 lines can thereby effectively be protected from over-voltages.

The gas arrester further comprises a common gas discharge region. A common gas discharge region is in particular formed between the individual electrodes and the discharge electrode. In other words, a plurality of separated gas discharge regions, each formed between an individual electrode and the discharge electrode, is avoided. There is, rather, a common region for gas discharge.

It is ensured in this way that when one path fires (arc discharge between an individual electrode and the discharge electrode), charge carriers are quickly emitted which lead to the firing of the respective neighboring path and finally to full firing. Voltage differences between cores or core pairs that could lead to destruction of the assembly are thus effectively avoided. A particularly effective gas arrester for the protection of data line systems is thus provided. The gas arrester is, furthermore, also very compact. Space can thus be saved on the circuit board. Very economical circuit boards can be built in this way.

According to an embodiment, the gas arrester comprises a ceramic body. The ceramic body can be of angular design, for example, rectangular, or round, for example, cylindrical. The ceramic body comprises, for example, $Al_2O_3$. The individual electrodes are introduced at least partially into the ceramic body. The individual electrodes have, for example, a cylindrical or rectangular partial region. This partial region is preferably at least partially surrounded by the ceramic body. The ceramic body is designed for the electrical isolation of the individual electrodes. It is thus ensured that no electrically conductive connection can be formed between the individual electrodes. A particularly reliable gas arrester is thus provided.

According to an embodiment, the discharge electrode is bonded in a gas-tight manner to the ceramic body. The discharge electrode and ceramic body are, for example, soldered together, for example, by means of brazing. The ceramic body is arranged at least partially between the discharge electrode and the individual electrodes. This serves the electrical isolation of the discharge electrode and the individual electrodes. A direct electrical contact between the individual electrodes and the discharge electrode can in particular be avoided thereby. Rather, an electrically conductive connection between individual electrodes and the discharge electrode only arises in the context of an arc discharge in the event of an over-voltage.

According to an embodiment, the ceramic body comprises a metallization. The metallization is preferably arranged at least partially on an outer surface of the ceramic body which faces the individual electrodes, for example, an end face of the ceramic body. The metallization is preferably arranged at least partially on an outer surface of the ceramic body which faces the discharge electrode, for example, a further end face of the ceramic body. The individual electrodes are bonded to the ceramic body through the metallization in a gas-tight manner. The individual electrodes are preferably soldered to the ceramic body, in particular the metallization, for example, by means of brazing. The same applies to the discharge electrode.

The metallization is preferably formed in such a way that an electrically conductive connection between the individual electrodes is avoided. In particular, the metallization can also be formed in only the partial regions of the end face of the ceramic body that faces the individual electrodes.

According to an embodiment, the ceramic body comprises a plurality of chambers. Preferably a number of the chambers correspond to a number of individual electrodes. The ceramic body comprises, for example, four or eight chambers. The chambers are formed as openings. In other words, the chambers fully penetrate through the ceramic body, for example, in a horizontal direction. The chambers are designed for at least partial inclusion of the individual electrodes. The individual electrodes are effectively spatially separated from each other in this way. The development of a conductive connection between the individual electrodes is effectively prevented.

According to one form of embodiment, the chambers are filled with a gas, for example, a noble gas. The chambers are, for example, part of the common gas discharge region of the gas arrester. The chambers are each separated from one another by a separating wall. The separating wall is part of the ceramic body. The separating wall comprises, in particular, ceramic material.

The respective separating wall comprises an incision or a notch. The incision can, for example, be formed by milling out the separating wall. The incision can have a round or angular form. The respective incision extends in the horizontal direction over the full extent of the separating wall. The respective incision is designed and arranged to enable an exchange of gas between the chambers. A common gas discharge region is thus made available between the individual electrodes and the discharge electrode in a simple and effective manner.

The use of a gas arrester is indicated according to a further aspect. The use of the gas arrester described above is indicated in particular. All the features that have been described in connection with the gas arrester are also applicable to the use of the gas arrester, and vice versa. The use of the gas arrester is described here, wherein the gas arrester is employed for the decay of voltage differences between cores or core pairs of data line systems with >>2 lines. Through the plurality of individual electrodes and the common gas discharge region, voltage differences between the cores/core pairs are effectively avoided. The design, in particular a form and shape of the gas arrester, is here particularly suitable for its use for the protection of Ethernet ports.

BRIEF DESCRIPTION OF THE DRAWINGS

The invention is explained in more detail below with reference to embodiments and the associated figures.

The drawings described below are not to be understood as being true to scale. Individual dimensions can, rather, be illustrated in an enlarged, reduced or even distorted manner for the sake of better illustration.

Elements that are the same as one another or that performs the same function are identified with the same reference signs.

Figure 3:
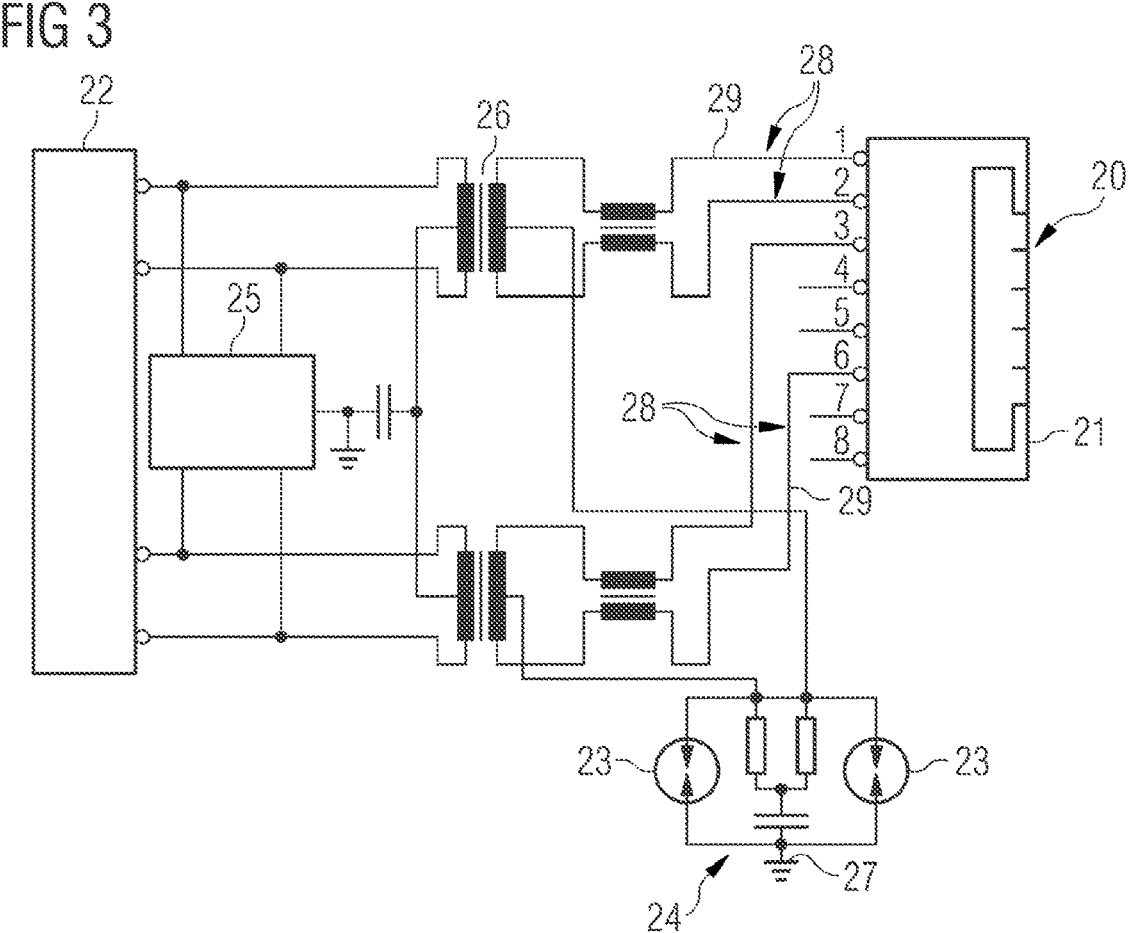
Figure 4:
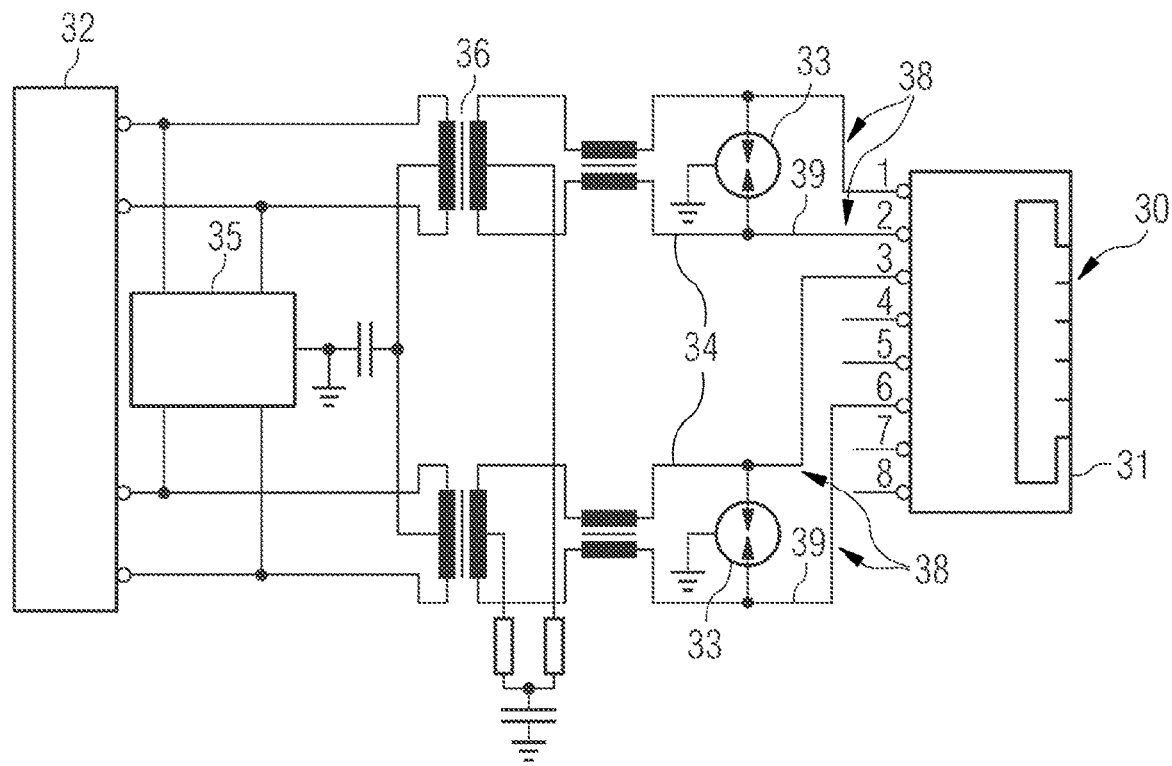

FIG. 1a shows an arrester for protection against over-voltages;

FIG. 1b shows an arrester for protection against over-voltages;

FIG. 2 shows a circuit diagram for a graded protection scheme for the protection of data lines in telecommunications applications;

FIG. 3 shows a circuit diagram of a protection circuit for an Ethernet port;

FIG. 4 shows a circuit diagram of a protection circuit for an Ethernet port;

FIG. 5 shows an exploded illustration of a gas arrester for data line systems; and FIG. 6 shows a sectional view of a gas arrester for data line systems.

DETAILED DESCRIPTION OF ILLUSTRATIVE EMBODIMENTS

FIGS. 1a and 1b show conventional arresters 1 for protection against over-voltages. There are fundamentally two kinds of gas-filled arresters 1: two-electrode arresters (FIG. 1a) and three-electrode arresters (FIG. 1b).

The two-electrode arrester 1 shown in FIG. 1a comprises a first electrode and a second electrode 2, as well as a ceramic body 8 for isolation. The arrester 1 comprises a discharge region 7 to enable an electrical discharge between the electrodes 2 in the presence of an over-voltage. In the presence of an over-voltage, a discharge, in particular an arc discharge, should take place in the discharge region 7 between the electrodes 2. The discharge region 7 can be filled with a gas, in particular a noble gas.

An ignition aid 6 (for example, made of graphite) is provided in the discharge region 7 at an inner face of the ceramic body 8, and assists the development of a discharge when the arrester 1 is triggered. An activation material 5, for example, silicates or alkaline metals, is further arranged in the discharge region 7. The development of an arc can be assisted by the activation material 5.

The gas-filled three-electrode arrester 1 shown in FIG. 1b comprises, in contrast to the arrester 1 of FIG. 1a, a first outer electrode 3, a second outer electrode 3 and a central electrode 4 which together bound the discharge space 7.

A so-called graded protection is often integrated (see FIG. 2) for the protection of data lines in telecommunications applications against over-voltages and over-currents. This means that a plurality of different, decoupled, protection elements/components (arresters, diodes) are connected one after another, in order to compensate for the disadvantages of the one through the advantages of the other. In the upper part of FIG. 2, the voltage curve tapped at the different electronic components is illustrated, while the lower part of FIG. 2 illustrates the circuit diagram 10 with the electronic components for the graded protection scheme.

An arrester 13, a varistor 15 and a suppression diode 16 are used in the graded protection scheme, in order to protect an electronic device 11 from a voltage surge 12. A decoupler 14, for example, a coil or a resistor, is in each case connected between the individual components 13, 15, 16 to decouple the individual components 13, 15, 16 so that the slow arrester 13 can fire before the faster varistor 15 or the even faster diodes 16.

A combination of gas arrester as the primary protection and suppression diode as secondary protection is employed as a rule in the data line field. FIG. 3 shows a circuit diagram 20 of a possible protection circuit for an Ethernet port 21 (100 Mbit, with two core pairs 28). The connection between the Ethernet port 21 and the LAN chip 22 over cores/conductors 29 is illustrated.

The secondary protection 25 (e.g., an array of diodes) is decoupled from the primary protection 24 by a transformer 26. The primary protection 24 is here connected at a center tap of the transformer 26 to ground 27, so that an over-voltage of the data line between the line and ground 27 can be short-circuited through the arrester 23. Any residual peaks pass, in attenuated form, through the transformer 26, but are then absorbed by the secondary protection 25.

A disadvantage of this circuit is that when one of the arresters 23 fires, the entire lightning current flows to ground through a part of the transformer choke. The voltages transferred in this way can go beyond the load capacity of the secondary protection 25.

To overcome this problem it is also possible for the primary protection to be integrated at a different place, as is illustrated in the circuit diagram 30 according to FIG. 4. The connection between the Ethernet port 31 and the LAN chip 32 over cores/conductors 39 is illustrated.

In the event of over-voltage, the lightning current now no longer flows through the transformer winding 36. The secondary protection 35 can thereby be protected from excessive loading. This circuit also has the additional advantage that over-voltages between the conductors 39 of a single core pair 38 can be limited by the gas arrester 33 (primary protection 34) being used.

A common disadvantage with the first circuit 20 is that excessively high potential differences between core pairs 38 can result when one of the arresters 33 fires. In the case of these loadings, the individual cores/conductors 39 are usually balanced externally with resistors. One of the four paths (conductor 39, here illustrated by the numbers 1, 2, 3 or 6 at the Ethernet port 31) will fire to ground first. The conductor 39 connected to the same arrester 33 will also fire as a result of the common gas space in this 3-electrode arrester 33, and the voltage difference will be limited to almost 0 V in the µs range.

Conventional over-voltage protection elements usually have two terminals (at most three terminals on 3-electrode arresters). These can therefore protect at most two cores with respect to ground. One electrode here is at ground potential, and each further electrode is provided for each conductor/each core of the conductor pair/core pair. In data lines with >>2 cores, this necessarily results in large voltage differences between cores or core pairs that can lead to the destruction of the assembly.

FIGS. 5 and 6 illustrate gas arresters for data line systems with >>2 lines, which effectively avoid voltage differences between cores or core pairs that could lead to the destruction of the assembly.

FIG. 5 in particular shows a device 40 for arresting over-voltages (gas arrester 40) with five electrodes 41, 46. The gas arrester 40 is thus designed for a data transmission system with four lines or cores, for example, a 100 Mbit Ethernet. The gas arrester 40 can, of course, also comprise fewer than five electrodes, for example, four electrodes, or more than five electrodes, for example, six, seven, eight or more electrodes.

The gas arrester 40 comprises four individual electrodes 41 (see the left-hand side in FIG. 5). The number of individual electrodes 41 is correspondingly adjusted for a gas arrester 40 with fewer or more electrodes. The gas arrester 40 can, consequently, also comprise three individual electrodes 41, or more than four individual electrodes 41, for example, five, six or more individual electrodes 41. The individual electrodes 41 are, for example, cold-extruded. The individual electrodes 41 comprise Cu or $FeNi_{42}$.

The individual electrodes 41 can be formed as pins or cylinders. The respective individual electrode 41 in this embodiment has in particular a pin-shaped first section 41a. A second section 41b of the respective individual electrode 41 is formed as a rectangular or square plate. The second section 41b can be viewed as a rear wall of the respective individual electrode 41. The two sections 41a, 41b are preferably made in one piece.

The gas arrester 40 further comprises a discharge or external electrode 46. The discharge electrode 46 has an elongated form. The discharge electrode 46 has, for example, a rectangular shape. The discharge electrode 46 comprises, for example, copper (Cu) or iron-nickel ($FeNi_{42}$).

The discharge electrode 46 comprises contact elements 46a (four pins in FIG. 5 in this example). A number of contact elements 46a correspond preferably to the number of individual electrodes 41. The contact elements 46a protrude from a surface (first or inner end face of the discharge electrode 46) of the discharge electrode 46. The contact elements 46a are arranged opposite to the individual electrodes 41 in the assembled gas arrester 40.

The contact elements 46a can be formed, for example, as pins or cylinders. Other shapes are, however, conceivable for the contact elements 46a. The shape of the respective contact element 46a preferably corresponds to the shape of the first section 41a of the respective individual electrode 41. In particular, the discharge electrode 46 in this embodiment is shaped like the individual electrodes 41, but with a common rear or connecting wall (second or outer end face of the discharge electrode 46).

The gas arrester 40 further comprises a ceramic body 42. The ceramic body 42 comprises, for example, an $Al_2O_3$ ceramic material. The ceramic body 42 serves the at least partial inclusion of the individual electrodes 41. The ceramic body 42 further serves the at least partial inclusion of the discharge electrode 46, in particular the contact elements 46a.

The ceramic body 42 comprises chambers 43 for this purpose. The number of chambers 43 corresponds to the number of individual electrodes 41. The number of chambers 43 corresponds to the number of contact elements 46a. It follows that in this case the gas arrester 40 comprises four chambers 43. The respective chamber 43 fully penetrates through the ceramic body 42. The respective chamber 43 in particular represents an opening through the ceramic body 42 in the horizontal direction h. The respective chamber 43 extends over a full thickness, or horizontal extent, of the ceramic body 42. The respective chamber 43 is filled with a gas, in particular with a noble gas.

In the assembled gas arrester 40, the first section 41a of the respective individual electrode 41 is introduced from a first side of the respective chamber 43 at least partially into the chamber 43. The respective contact element 46 is introduced at least partially into the chamber 43 from a second side of the respective chamber 43 which is located opposite the first side. The respective contact element 46a and the respective individual electrode 41 are thus arranged opposite one another in the respective chamber 43.

The individual chambers 43 are each separated from one another by a separating wall 44. The separating wall 44 is part of the ceramic body 42. The separating wall 44 comprises, in particular, ceramic material. Each separating wall 44 has an incision 45. In this embodiment, the incision 45 is formed, for example, milled, as a half-cylinder. Other forms, an angular form, for example, are however also conceivable for the incision 45.

The incision 45 extends fully across a horizontal extent (width) of the respective separating wall 44. The chambers 43 are connected to one another through the incisions 45. An exchange of gas between the individual chambers 43 continues to be possible as a result of the incisions 45 in the separating walls 44. A common gas space or gas discharge region of the gas arrester 40 is created in this way. When one of the paths of the gas arrester 40 fires (arc discharge between an individual electrode 41 and the discharge electrode 46), charge carriers are quickly emitted along this path into the neighboring chambers 43. A complete firing of the gas arrester 40 thus results. Large voltage differences between individual cores or core pairs can thus be avoided.

The ceramic body 42 further serves the insulation of the individual electrodes 41. The formation of an electrically conductive connection between the individual electrodes 41 is in particular prevented by the ceramic body 42.

The ceramic body 42 comprises a metallization (not illustrated explicitly). The metallization is arranged on a surface, at least on parts of the surface, of the ceramic body 42. In particular, the metallization preferably extends over a first outer surface 42a (hidden left-hand face in FIG. 5) and a second outer surface 42b (right-hand face on the opposite side in FIG. 5) of the ceramic body 42. In this case, the outer faces 42a, 42b represent the end faces of the ceramic body 42. The outer surfaces 42a, 42b, or end faces, face toward the electrodes 41, 46. The first outer or end face 42a faces toward the individual electrodes 41. The second outer or end face 42b faces toward the discharge electrode 46, in particular the inner end face of the discharge electrode 46.

The end faces 42a, 42b of the ceramic body 42 are metalized. The end faces 42a, 42b are furthermore nickel-plated. The metallization is executed on the first end face 42a in such a way that no conductive connection results between the individual electrodes 41. The metallization is, for example, arranged only in partial regions on the first end face 42a. The metallization is, for example, only located in a region that borders an opening of the respective chamber 43. Intermediate regions (separating walls) between the chambers 43 can be at least partially free from metallization.

A partial region of the second section 41b of the respective individual electrode 41 (inner end face of the second section 41b) lies on the first end face 42a of the ceramic body 42, in particular its metallization. The individual electrodes 41, in particular the partial region of the second section 41b of the respective individual electrode 41, are soldered, for example, by means of brazing, for example, with $Ag_{72}Cu_{28}$, at the first end face 42a to the ceramic body 42. A gas-tight connection between the individual electrodes 41 and the ceramic body 42 is in particular formed.

The discharge electrode 46 is furthermore soldered, for example, by means of brazing, to the ceramic body 42, in particular the second end face 42b. The gas arrester is sealed through the attachment of the discharge electrode 46 and the gas-tight soldering to the metallization.

An ignition aid 47 (for example, made of graphite) is provided in the gas discharge region at an inner face of the ceramic body 42 (inner region of the respective chamber 43), and assists the development of a discharge when the gas arrester 40 is triggered.

An activation material 48, for example, silicates or alkaline metals, is further arranged in the gas discharge region. The development of an arc can be assisted by the activation material 48. The activation material 48 can be formed in each case at an individual electrode 41. The activation material 48 can be formed in an end region of the respective individual electrode 41. This end region is arranged in the respective chamber 43 in the assembled gas arrester 40. The end region is arranged in the chamber 43 opposite an end region of the respective contact element 46a.

In contrast to FIG. 5, FIG. 6 shows an embodiment of a device 50 for discharging over-voltages (gas arrester 50) with eight individual or core electrodes 51. The gas arrester 50 is thus designed for a data transmission system with eight conductors or cores, for example, a gigabit Ethernet. The gas arrester 50 can, of course, also comprise fewer than eight individual electrodes 51, for example, six individual electrodes, or more than eight individual electrodes 51, for example, ten or more individual electrodes.

Like the gas arrester 40 illustrated in FIG. 5, the gas arrester 50 according to FIG. 6 comprises a common discharge electrode 55. The discharge electrode 55 has the shape of an "H" when viewed from above. The individual electrodes 51 are each introduced from two sides to a horizontal wall of the "H".

A common gas discharge region 53 is formed between the electrodes 51, 55. A ceramic material or a ceramic body 52 serves the electrical isolation of the individual electrodes 51. The two vertical walls of the "H" close off the gas discharge region 53, and are bonded in a gas-tight manner to the ceramic body 52 at their end regions.

The ceramic material 52 comprises, for example, $Al_2O_3$. In this embodiment, the ceramic material 52 and the electrodes 51, 55 have an angular form. A different form, for example, a round form, is of course conceivable for the ceramic material 52 and the electrodes 51, 55. The ceramic material 52 comprises chambers or openings 56. The chambers 56 penetrate fully through the ceramic material 52. The chambers 56 are designed for at least partial inclusion of the individual electrodes 51. The chambers 56 are sealed in a gas-type manner by the individual electrodes 1. The individual electrodes 51 are preferably soldered to inner walls of the chambers 56. The common gas discharge region 53 is formed in this way.

An ignition aid 57 (for example, made of graphite) is provided in the gas discharge region 53 at an inner face of the ceramic material 52, and assists the development of a discharge when the arrester 50 is triggered. An activation material 54, for example, silicate or an alkaline metal is arranged between the individual electrodes 51 and the discharge electrode 55. The activation material 54 can, for example, be arranged on a surface of the respective individual electrode 51 which faces toward a surface of the discharge electrode 55.

A complete firing of the gas arrester 50 can be achieved with or as a result of the firing of a path through the above-described arrangement of a plurality of individual electrodes 51 with a common gas discharge region 53. Voltage differences between individual cores or core pairs can thus be reduced or avoided. The gas arrester 50 according to FIG. 6 can, furthermore, be effectively stacked and solder-sealed.

Both the gas arresters 40, 50 illustrated in FIGS. 5 and 6 are, furthermore, designed for fully automated surface mounting (SMD). A significant degree of space is saved on the circuit board through this assembly technique. Very economical circuit boards can be built in this way.

The invention is not restricted to the description based on the embodiments. The invention rather comprises any new feature or any combination of features that in particular contains any combination of features in the patent claims, even when this feature or this combination is not itself explicitly stated in the patent claims or embodiments.

The invention claimed is:

1. A gas arrester for data line systems, the gas arrester comprising:
a discharge electrode;
a plurality of individual electrodes for connection to data lines;
a common gas discharge region formed between the individual electrodes and the discharge electrode; and
a ceramic body configured for an electric isolation of the individual electrodes,
wherein the individual electrodes are introduced at least partially into the ceramic body,
wherein the ceramic body comprises a plurality of chambers configured for at least partial inclusion of the individual electrodes, and
wherein a number of the chambers corresponds to a number of individual electrodes.

2. The gas arrester according to claim 1,
wherein the discharge electrode is bonded in a gas-tight manner to the ceramic body, and
wherein the ceramic body is arranged at least partially between the discharge electrode and the individual electrodes for an electric isolation of the discharge electrode and the individual electrodes.

3. The gas arrester according to claim 1,
wherein the ceramic body comprises a metallization, and
wherein the individual electrodes are bonded to the ceramic body through the metallization in a gas-tight manner.

4. The gas arrester according to claim 1, wherein the chambers fully penetrate through the ceramic body.

5. The gas arrester according to claim 1, wherein the chambers are filled with a gas.

6. The gas arrester according to claim 5, wherein the chambers are each separated from one another by a separating wall comprising an incision, which is arranged to enable an exchange of gas between the chambers.

7. The gas arrester according to claim 1, wherein the ceramic body, the individual electrodes or both the ceramic body and the individual electrodes are of rectangular form.

8. The gas arrester according to claim 1, wherein the ceramic body, the individual electrodes or both the ceramic body and the individual electrodes are of cylindrical form.

9. The gas arrester according to claim 1, wherein the gas arrester comprises at least four individual electrodes.

10. The gas arrester according to claim 1, wherein the gas arrester is configured to prevent voltage differences between cores and core pairs in the data line systems with more than 2 lines.

11. The gas arrester according to claim 1, wherein the gas arrester is configured for a decay of voltage differences between cores or core pairs of data line systems with more than 2 lines.

12. The gas arrester according to claim 1, wherein the gas arrester is configured for a protection of Ethernet ports against over-voltage.

13. The gas arrester according to claim 1, further comprising:
contact elements of the discharge electrode, the contact elements comprising pins or cylinders; and
first sections of the individual electrodes, the first sections comprising pins or cylinders.

14. A gas arrester comprising:
a discharge electrode;
contact elements of the discharge electrode, the contact elements comprising pins or cylinders;
a plurality of individual electrodes for connection to data lines, first sections of the individual electrodes comprising pins or cylinders;
a common gas discharge region formed between the individual electrodes and the discharge electrode;
a ceramic body configured for an electric isolation of the individual electrodes, the individual electrodes being introduced at least partially into the ceramic body;
chambers of the ceramic body; and
separating walls separating the chambers from one another, each of the separating walls comprising an incision allowing an exchange of gas between the chambers.

15. A gas arrester for data line systems, the gas arrester comprising:
a discharge electrode;
a plurality of individual electrodes for connection to data lines;
a common gas discharge region formed between the individual electrodes and the discharge electrode; and
a ceramic body configured for an electric isolation of the individual electrodes,
wherein the individual electrodes are introduced at least partially into the ceramic body,
wherein the ceramic body comprises a metallization, and
wherein the individual electrodes are bonded to the ceramic body through the metallization in a gas-tight manner.

16. The gas arrester according to claim 15, wherein the ceramic body, the individual electrodes or both the ceramic body and the individual electrodes are of rectangular form or cylindrical form.

17. The gas arrester according to claim 15, wherein the gas arrester is configured to prevent voltage differences between cores and core pairs in the data line systems with more than 2 lines.

18. The gas arrester according to claim 15, wherein the gas arrester is configured for a decay of voltage differences between cores or core pairs of data line systems with more than 2 lines.

19. The gas arrester according to claim 15, wherein the gas arrester is configured for a protection of Ethernet ports against over-voltage.

20. The gas arrester according to claim 15, further comprising:
contact elements of the discharge electrode, the contact elements comprising pins or cylinders; and
first sections of the individual electrodes, the first sections comprising pins or cylinders.

* * * * *